(12) United States Patent
McBride et al.

(10) Patent No.: US 11,118,683 B2
(45) Date of Patent: Sep. 14, 2021

(54) SHIELD DEVICE FOR A SEAL

(71) Applicant: Aktiebolaget SKF, Gothenburg (SE)

(72) Inventors: Tadd McBride, Riverton, UT (US); Brandon Green, Taylorsville, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 315 days.

(21) Appl. No.: 16/295,205

(22) Filed: Mar. 7, 2019

(65) Prior Publication Data
US 2020/0284349 A1    Sep. 10, 2020

(51) Int. Cl.
*F16J 15/32* (2016.01)
*F16J 15/3252* (2016.01)
*F16J 15/3204* (2016.01)

(52) U.S. Cl.
CPC ....... *F16J 15/3252* (2013.01); *F16J 15/3204* (2013.01)

(58) Field of Classification Search
CPC .. F16J 15/3252; F16J 15/3204; F16J 15/3248; F16J 15/3268
See application file for complete search history.

(56) References Cited

U.S. PATENT DOCUMENTS

| | | | | |
|---|---|---|---|---|
| 5,129,744 A * | 7/1992 | Otto | ...................... | B21B 31/078 277/351 |
| 5,183,269 A * | 2/1993 | Black | ...................... | F16C 33/76 277/349 |
| 6,213,476 B1 * | 4/2001 | Chandler | ............. | F16J 15/3244 277/562 |
| 6,257,587 B1 * | 7/2001 | Toth | ...................... | F16J 15/3256 277/309 |
| 6,357,754 B1 * | 3/2002 | Rieder | .................. | F16C 21/005 277/394 |
| 7,681,888 B2 * | 3/2010 | Kurosawa | ............. | B62D 5/062 277/353 |

* cited by examiner

*Primary Examiner* — Gilbert Y Lee
(74) *Attorney, Agent, or Firm* — J-Tek Law PLLC; Scott T. Wakeman; Mark A. Ussai (57) ABSTRACT

A shield device prevents materials from contacting a seal for a shaft extending outwardly from a housing and displacing a mounted component. The shield device includes an annular disk having opposing first and second radial surfaces and outer and inner circumferential edges, the inner edge defining a bore for receiving the shaft. The disk is coupleable with the shaft so as to be disposed between the component and the housing and is spaced axially above the seal such that the first radial surface faces the seal. The disk has an outside diameter greater than the seal outside diameter and overlaps the seal with the disk outer edge being spaced radially outwardly from the seal to provide a barrier about the seal. Preferably, an annular projection extends axially outwardly from the first, lower radial surface and is disposeable within a circular groove of the housing that extends about the seal.

15 Claims, 8 Drawing Sheets

SHIELD DEVICE FOR A SEAL

BACKGROUND OF THE INVENTION

The present invention relates to seals, and more particularly to shield devices for preventing solid materials from contacting seals.

Radial lip seals are well known and used in a variety of applications. Such seals typically include an annular seal body formed of an elastomeric or other polymeric material (e.g., urethane, nylon, etc.), which provides a circular sealing lip, and a casing containing the seal body and adapted to mount the seal within a bore, a gland, etc. When used in certain environments, such as on an agricultural or construction vehicle, dirt, stones or other debris may contact the seal, which can lead to damage or failure of thereof.

SUMMARY OF THE INVENTION

In one aspect, the present invention is a shield device for preventing materials from contacting an annular seal, the seal sealing about a shaft extending outwardly from a housing upper surface, the shaft being angularly displaceable about an axis to displace a driven component mounted on the shaft. The shield device comprises an annular disk having a centerline, a first radial surface, an opposing second radial surface, an outer circumferential edge and an inner circumferential edge defining a central bore sized to receive the shaft. The disk is coupleable with the shaft so as to be disposed between the driven component and the housing and spaced axially above the seal such that the first radial surface generally faces the seal. The disk has an outside diameter greater than an outside diameter of the seal such that the disk overlaps the seal and the disk outer edge is spaced radially outwardly from the seal so as to provide a barrier about the seal.

In another aspect, the present invention is again a shield device as described above and further comprising an annular projection extending axially outwardly from the first radial surface, spaced radially outwardly from the disk bore, and extending circumferentially about the disk centerline. The projection is at least partially disposeable within a circular groove of the housing, the groove being spaced radially outwardly from and extending circumferentially about the seal.

In yet another aspect, the present invention is again a shield device as described above and further comprising an outer skirt extending axially from and circumferentially about at least a portion of the disk outer edge and sized to at least partially enclose an annular opening between the disk outer edge and the housing upper surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "lower" and "upper" designate directions in the drawings to which reference is made. The words "axial" and "axially" each refer to directions generally along or generally parallel to a designated central axis $A_C$ or centerline $L_C$. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a shield device 10 for preventing materials from contacting an annular seal 1. The seal 1 is preferably a radial lip seal having a sealing lip 1a sealingly engaged with the outer surface 2a of a shaft 2 extending generally vertically outwardly and upwardly from an upper surface 3 of a housing 4, which collectively form a mechanical assembly M. The shaft 2 is angularly displaceable about a central axis $A_C$ to displace a driven component 5 mounted on the shaft 2, for example a connecting arm of a combine knife mechanism, a drive link, or any other appropriate component angularly displaceable (either oscillatory or rotatably) by means of a shaft. The shield device 10 basically comprises an annular disk 12 having a centerline $L_C$, a first radial surface 14, an opposing second radial surface 16, an outer circumferential edge 12a and an inner circumferential edge 12b defining a central bore 18 sized to receive the shaft 2. The disk 12 is coupleable with the shaft 2 so as to be disposed between the component 5 and the housing 4 (with the disk centerline $L_C$ being substantially colinear with the shaft axis $A_C$), and is thus angularly displaceable with the shaft 2 and the component 5 about the axis $A_C$.

When so connected, the disk 12 is spaced axially (and vertically) above the seal 1 such that the first, lower radial surface 14 generally faces the seal 1 and the second, upper surface 16 generally faces the driven component 5. Further, the disk 12 has an outside diameter $OD_D$ greater than an outside diameter $OD_S$ of the seal 1 so that the disk 12 overlaps the seal 1 and the disk outer edge 12a is spaced a substantial distance radially outwardly from the seal 1. The disk 12 is sized such that a ratio of the disk outside diameter $OD_D$ to the seal outside diameter $OD_S$ is at least 1.15 and preferably at least 1.3, most preferably about 1.6. Thereby, the disk 12 alone provides a basic barrier to prevent particles or solid materials (e.g., dirt, rocks, etc.) from migrating into the region about the seal 1, as such materials may potentially damage the seal material.

To improve performance, the seal device 10 preferably further comprises at least one of, and preferably both, a central annular projection 20 and an outer annular skirt 22. More specifically, the central annular projection 20 is generally cylindrical and has a first axial end 20a connected with the disk 12, an opposing, free second axial end 20b, and inner and outer circumferential surfaces 21A, 21B, respectively. The projection 20 extends axially outwardly from the first, lower radial surface 14 of the disk 12, is spaced radially outwardly from the disk bore 18 and extends circumferentially about the disk centerline $L_C$. The annular projection 20 is at least partially disposeable within a circular groove 6 of the housing 4, which extends inwardly (and downwardly) from the housing upper surface 3 and is spaced radially outwardly from, and extends circumferentially about, the seal 1. At a minimum, the projection 20 forms a labyrinth seal with the groove 6, i.e., forms a tortuous path $P_{T1}$ through the groove 6 about the projection 20, which further inhibits material migration toward the seal 1.

However, the shield device 10 preferably further comprises an annular bead 24 which functions as a fulcrum to pivot the projection 20 into engagement with a sidewall 6a of the groove 6. Specifically, the bead 24 extends axially outwardly from the disk first, lower radial surface 14 and circumferentially about the disk centerline $L_C$, and is disposed radially between the annular projection 20 and the disk central bore 18. The bead 24 is preferably disposeable on the seal 1, specifically a wall portion of a seal casing 1b, as depicted in the drawings, but may alternatively be disposed on a section of the housing upper surface 3 surrounding the seal 1 (arrangement not shown). With the annular "fulcrum" bead 24, when the disk second, upper radial surface 16 is contacted by the component 5 as discussed below, at least a portion of the disk 12 is pivoted or deflected about the bead 24. Due to such disk deflection, the projection 20 is displaced a further depth into the groove 6 and a lower circular edge 29 of the projection free axial end 20b engages against the groove sidewall 6a or is at least closely spaced from the sidewall 6a to constrict the tortuous path $P_{T1}$ (FIGS. 4 and 7) through the groove 6.

Referring to FIGS. 1 and 3-5, the outer annular skirt 22 extends axially from and circumferentially about at least a portion of the disk outer edge 12a and is sized to at least partially enclose an annular opening 15 between the disk outer edge 12a and the housing upper surface 3. More specifically, the skirt 22 has an inner end 22a connected with (preferably integrally formed with) the disk outer edge 12a, a free, outer end 22b, and opposing inner and outer circumferential surfaces 23A, 23B, respectively. Preferably, the housing 4 has an at least generally circular projection or "boss" 7 with a cylindrical outer surface 7a which at least partially surrounds the shaft 2, the housing upper surface 3 being formed on the boss 7 as depicted, and the skirt 22 is sized to overlap the circular boss 7 so as to provide an umbrella-like structure thereabout.

In certain housing structures, the boss 7 extends completely about the shaft 2 and the shield device 10 for such an application has a skirt 22 that preferably extends circumferentially about the entire disk outer edge 12a. However, for housing constructions in which the boss 7 is not a "full cylinder", i.e., has a cylindrical surface 7a that extends only partially about the shaft 2, the skirt 22 preferably has a cut-out section (not shown) that extends above an extended surface section (not depicted) of the housing upper surface 3. Further, the skirt 22 is preferably generally frustoconical and extends both axially and radially outwardly from the disk outer edge 12a as depicted, but may alternatively be substantially cylindrical, generally curved or have any other appropriate shape.

In any case, the skirt 22 at least forms a labyrinth seal with the housing 4, preferably about the boss cylindrical surface 7a, so as to provide a tortuous path $P_{T2}$ (FIGS. 1 and 3) between an inner circumferential surface 23A of the skirt 22 and the cylindrical surface 7a. However, as with the annular projection 20, the pivoting of at least a portion of the disk 12 (i.e., caused by contact of the driven component 5 against the disk second, upper surface 16) about the bead 24 causes a circular inner edge 25 of the skirt outer end 22b to preferably sealingly engage against the housing cylindrical surface 7a or at a minimum restrict the tortuous path $P_{T2}$ in the region between the skirt edge 25 and the cylindrical surface 7a. Further, when the boss 7 extends only partially about the shaft 2, or the housing 4 has no boss about the shaft 2, the skirt free, outer end 22a is preferably at least disposed proximal to, or sealingly engages with, generally flat surface sections of the housing upper surface 3.

Figure 6:
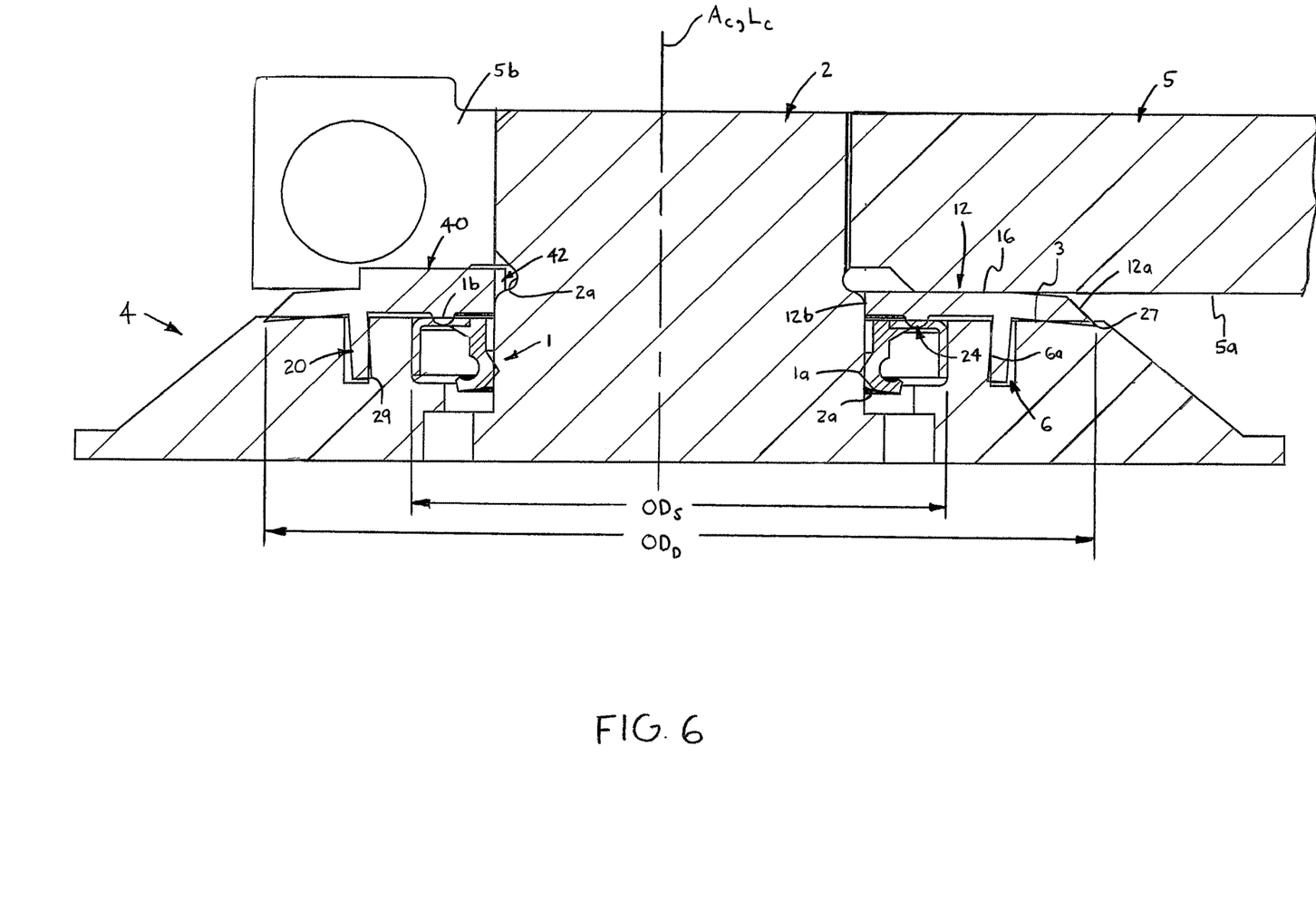
FIG. 6 is an axial cross-sectional view of the mechanical assembly including an alternative construction of the shield device in accordance with the present invention.
Figure 7:
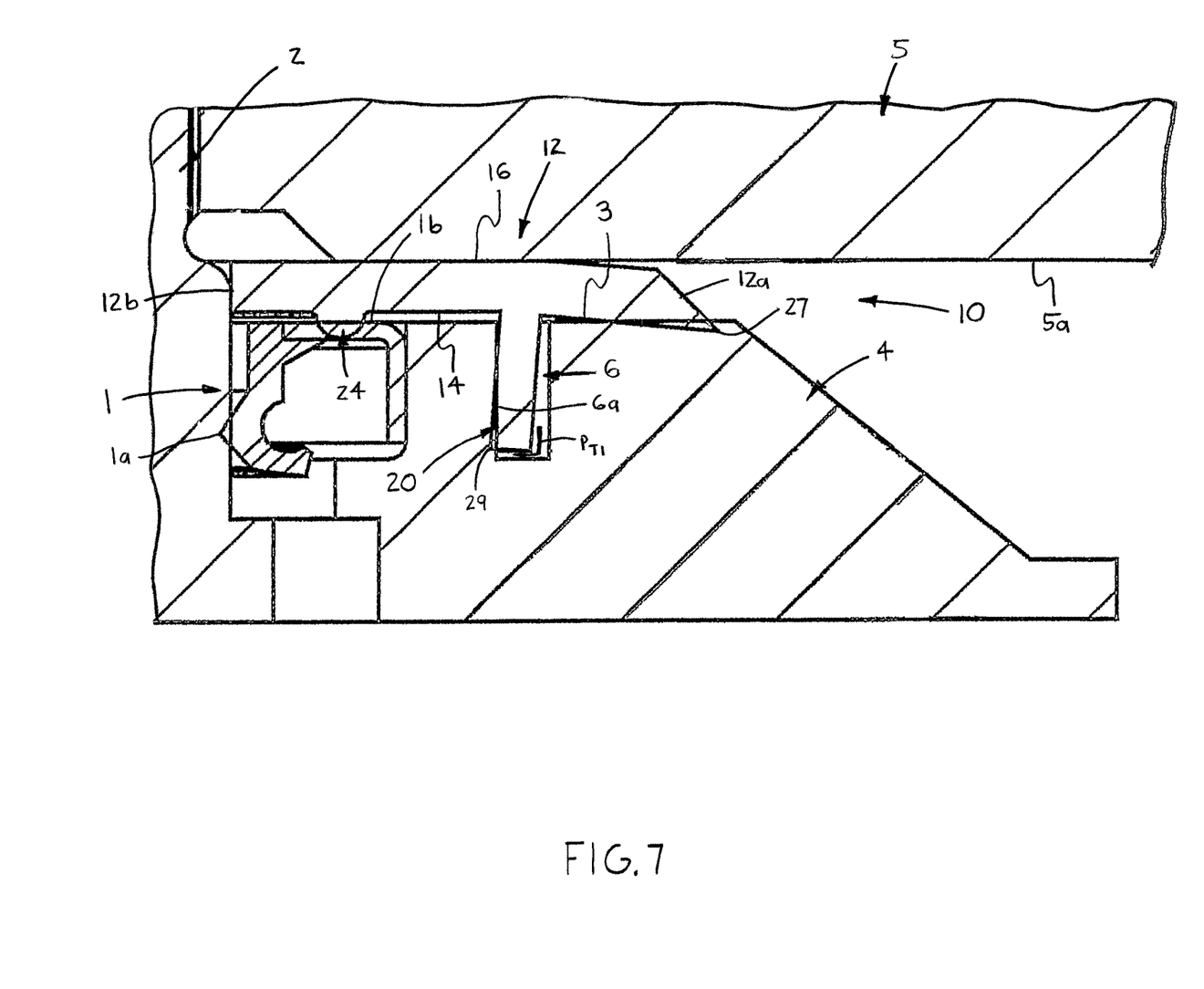
FIG. 7 is a broken-away, enlarged view of a portion of FIG. 6.
Figure 8:
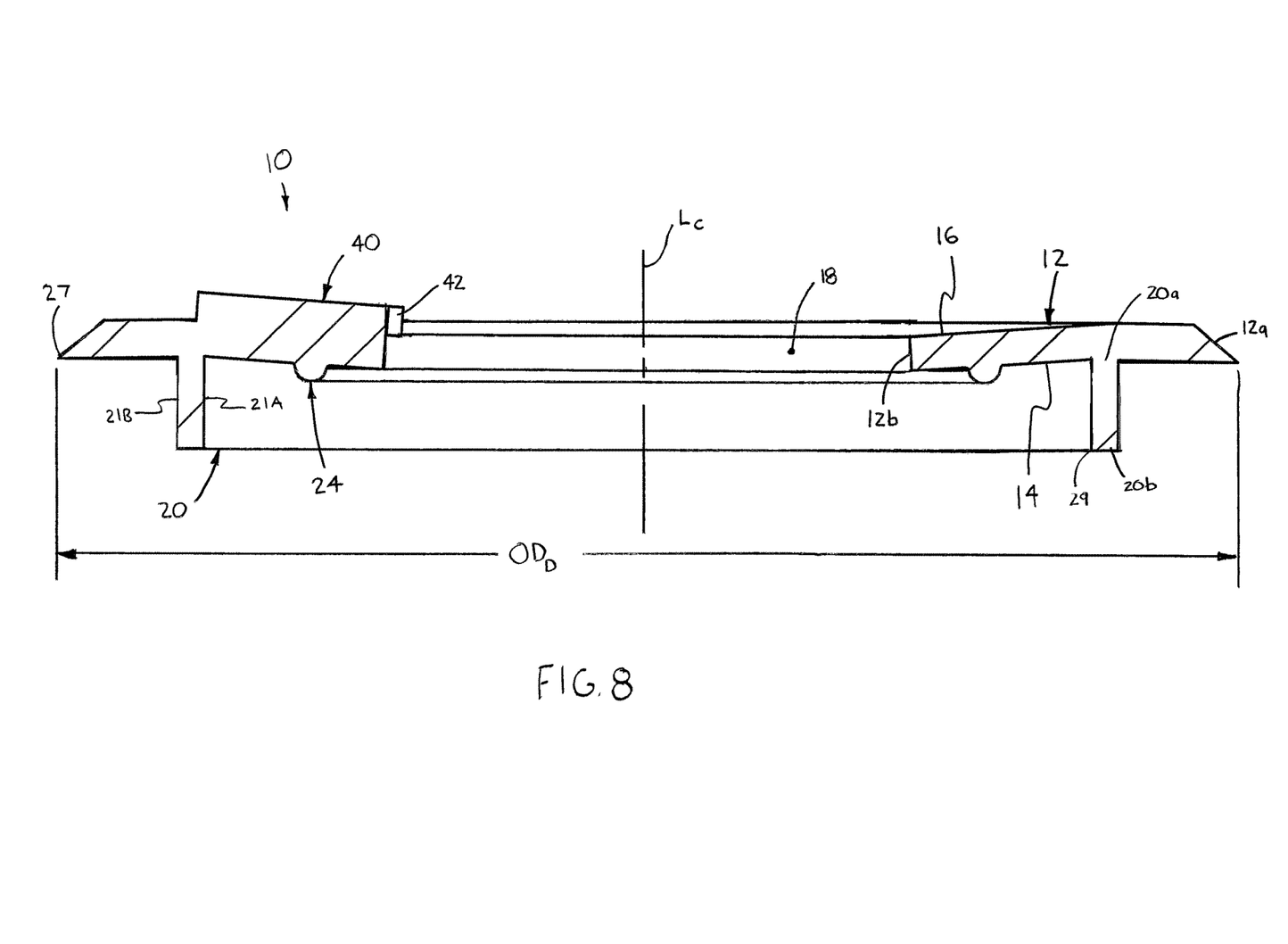
FIG. 8 is an axial cross-sectional view of the alternative shield device in the un-deflected state.

However, in an alternative construction depicted in FIGS. 6-8, the shield device 10 may be formed without a skirt and with a disk 12 having an outer edge 12a that is tapered to form a relatively narrow contact lip 27. The disk contact lip 27 is sealingly engageable with the housing upper surface 3, such that the migration of particles, etc. toward the seal 1 is prevented by the barrier provided by the disk 12 as well as the sealing engagement of both the projection 20 and the disk contact lip 27.

Figure 1:
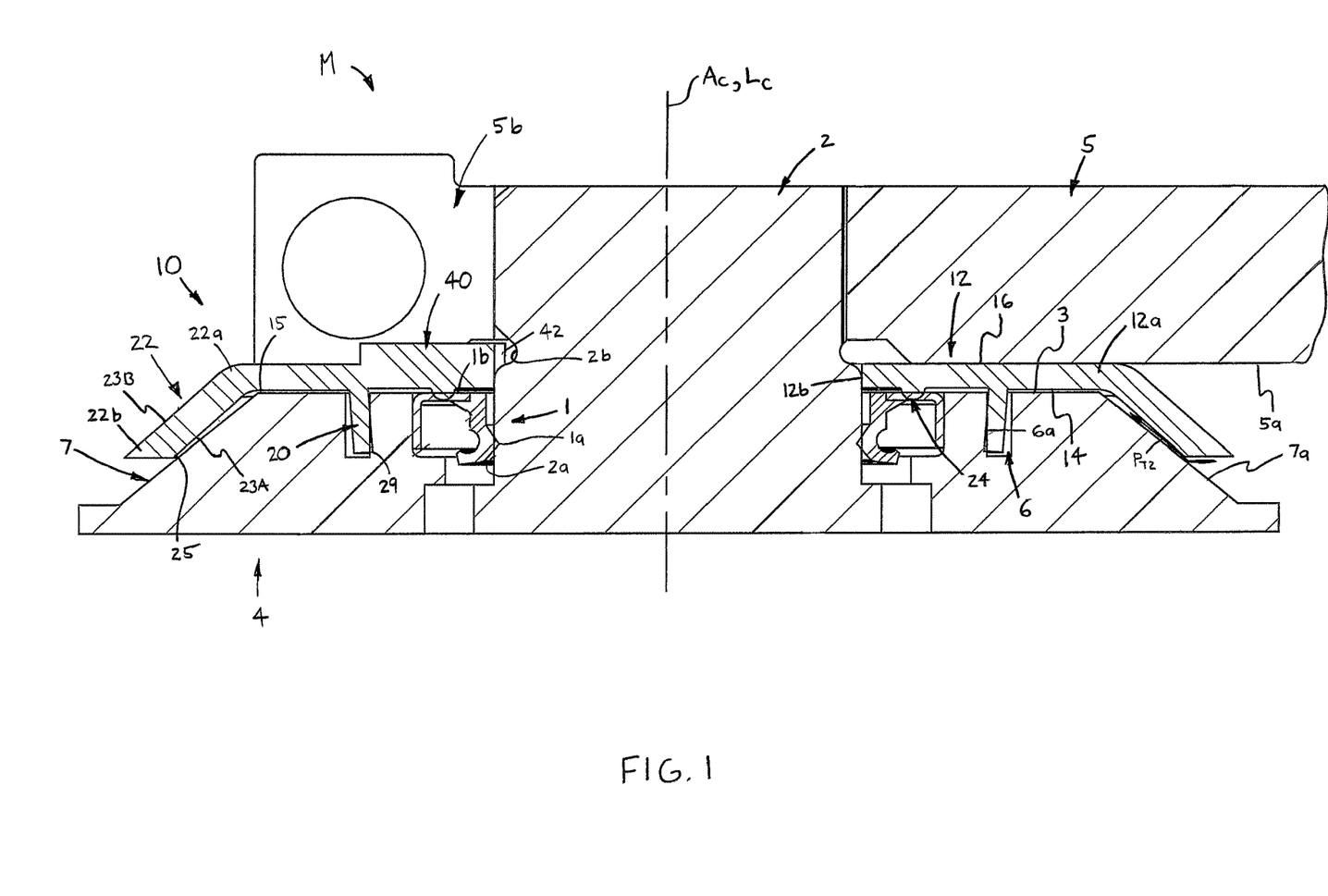
FIG. 1 is an axial cross-sectional view of a mechanical assembly including a first construction shield device in accordance with the present invention.
Figure 2:
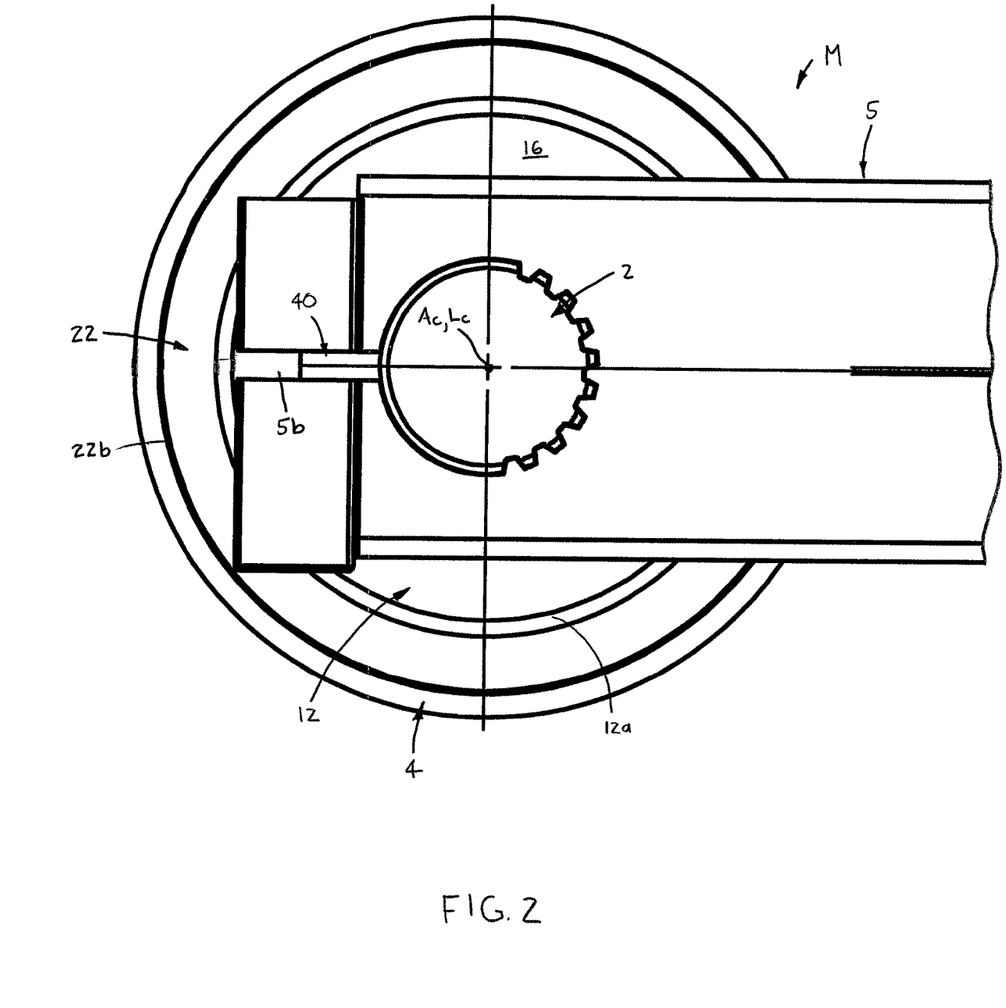
FIG. 2 is a top plan view of the mechanical assembly of FIG. 1.
Figure 3:
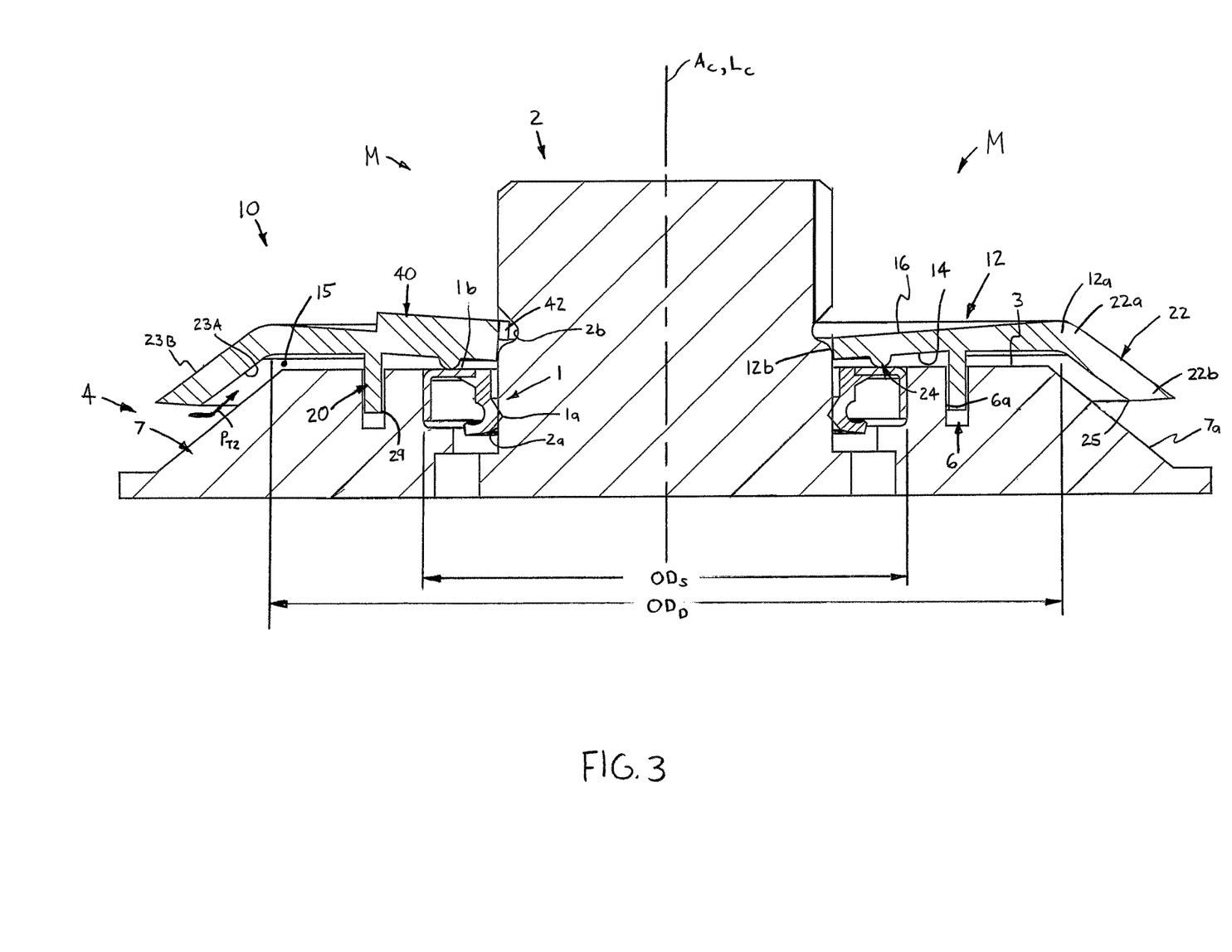
FIG. 3 is another axial cross-sectional view of the mechanical assembly of FIG. 1, shown without a driven component of the assembly and with the shield device in a free, un-deflected state.
Figure 4:
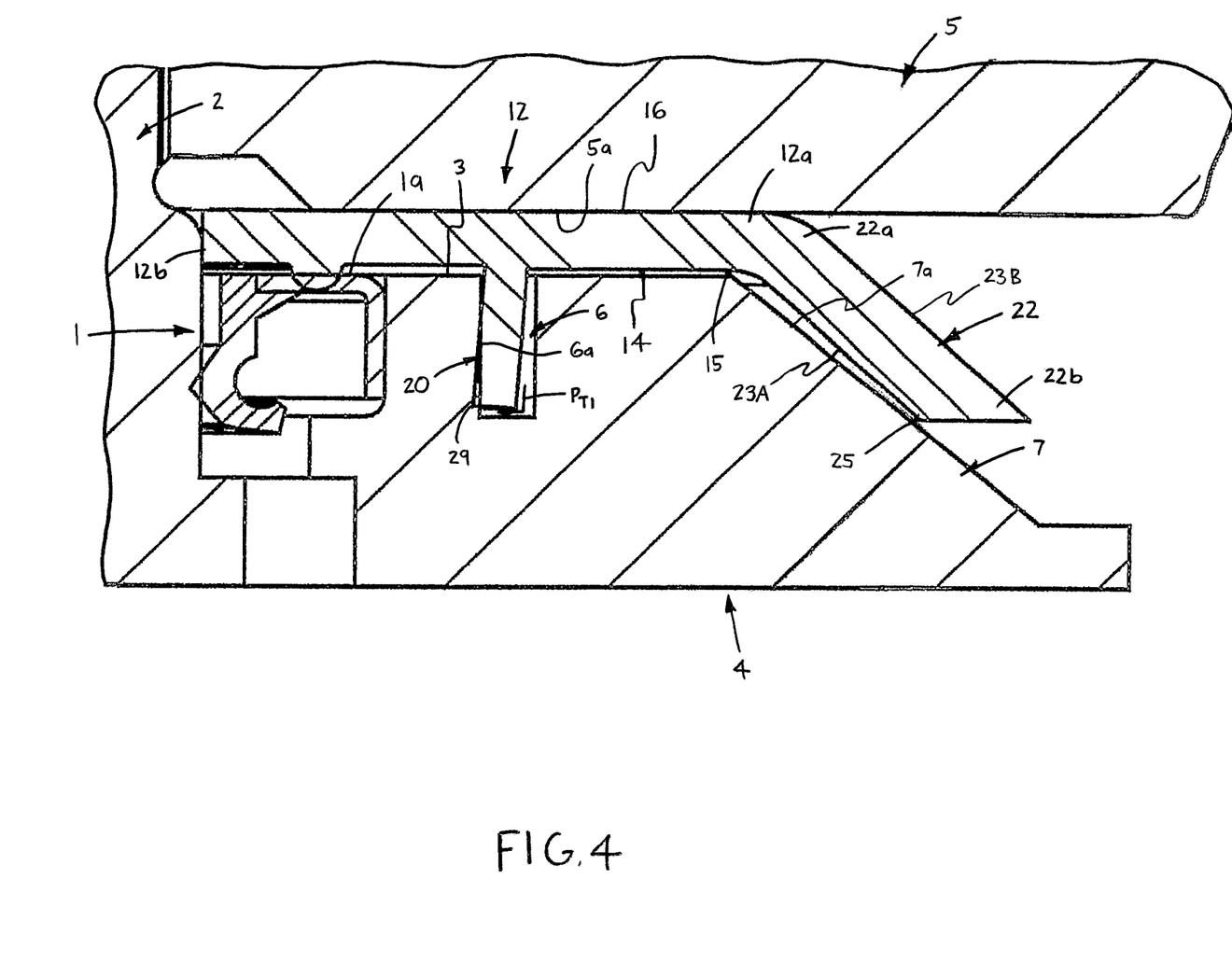
FIG. 4 is a broken-away, enlarged view of a portion of FIG. 1.
Figure 5:
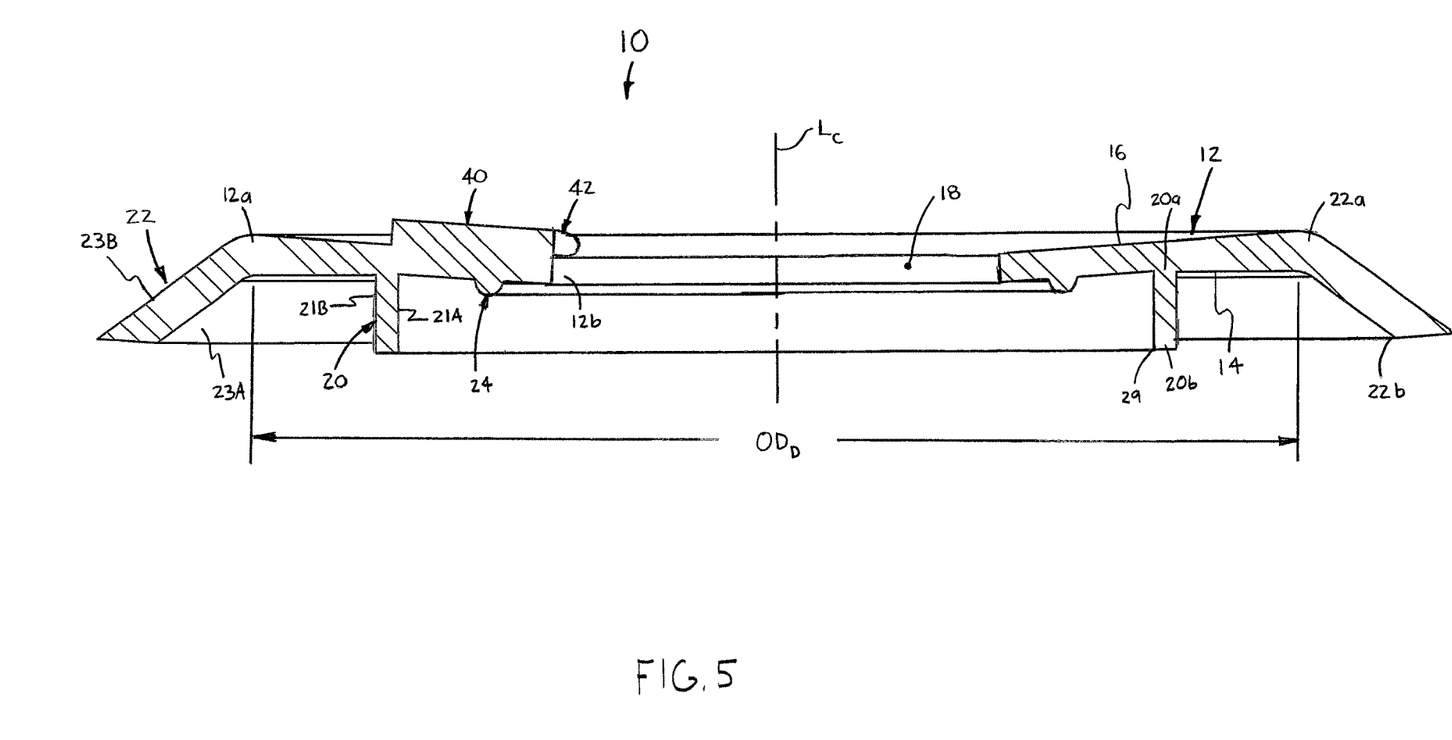
FIG. 5 is an axial cross-sectional view of the shield device in the un-deflected state.

As depicted in FIGS. 5 and 8, the disk 12 is preferably generally frustoconical such that the first, lower radial surface 14 is generally convex, the second, upper radial surface 16 is generally concave, and the disk outer edge 12a is spaced axially upwardly from the disk inner edge 12b. With this structure, the driven component 5 deflects the disk 12 generally axially toward the housing upper surface 3 when the component 5 is mounted upon the shaft 2. Specifically, during mounting of the driven component 5 on the shaft 2, the lower surface 5a of the component 5 contacts first the disk outer edge 12a, or the inner edge 22a of the skirt 22, and then the disk upper surface 16 as the component 5 displaces axially downwardly on the shaft 2, which causes the disk 12 to deflect in the manner of a Belleville spring and pivots the projection 20 and the skirt 22 about the bead 24 as described above. Although preferably generally frustoconical, the disk 12 may alternatively be substantially flat (e.g., washer-like), curved or have any other appropriate shape in which the shield device 10 is capable of functioning as generally described herein.

Referring to FIGS. 1-3, 6 and 8, the shield device 10 preferably further comprises a coupler tab 40 extending axially outwardly from the disk second, upper radial surface 14 and having a protrusion 42 extending radially inwardly beyond the disk inner edge 12b. The coupler tab 40 is disposeable within a slotted opening 5b of the driven component 5 so as to connect the disk 12 with the component 5, and thereby indirectly couple the shield device 10 with the shaft 2 so that the device 10 angularly displaces with the shaft 2. Preferably, the driven component 5 is configured to clamp upon the tab 40 when disposed within the opening 5b, such as by means of a threaded fastener (not depicted) which also clamps the component 5 on the shaft 2, but the tab 40 may merely be retained within the slotted opening 5b by a friction fit. Further, the tab protrusion 42 is engageable with a slot 2b on the shaft 2 so as to couple the disk 12 directly with the shaft 2. However, the shield device 10 may be coupled with the shaft 2 by only the tab 40 or solely by the protrusion 42 or in any other appropriate manner, such as a friction fit between the shaft 12 and the disk bore 18.

Preferably, the annular projection 20, the skirt 22, the annular bead 24, and the tab 40 are all integrally formed with the disk 12. As such, the shield device 10 is preferably of one-piece construction and preferably formed of polymeric material, most preferably molded of ECOPUR™ urethane However, any of the shield components 20, 22, 24 or/and 40 may be formed separately from and thereafter attached to the disk 12 by any appropriate means, or/and the shield device 10, or any portion thereof, may be formed of any other appropriate material (e.g., steel, aluminum, etc.) by any other appropriate process (e.g., stamping, casting and machining, etc.).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A shield device for preventing materials from contacting an annular seal, the seal sealing about a shaft extending outwardly from a housing upper surface, the shaft being angularly displaceable about an axis to displace a driven component mounted on the shaft, the shield device comprising:
    an annular disk having a centerline, a first radial surface, an opposing second radial surface, an outer circumferential edge and an inner circumferential edge defining a central bore sized to receive the shaft, the disk being coupleable with the shaft so as to be disposed between the driven component and the housing and spaced axially above the seal such that the first radial surface generally faces the seal, the disk having an outside diameter greater than an outside diameter of the seal such that the disk overlaps the seal and the disk outer edge is spaced radially outwardly from the seal so as to provide a barrier about the seal;
    an annular projection extending axially outwardly from the first radial surface, spaced radially outwardly from the disk bore, and extending circumferentially about the disk centerline, the projection being at least partially disposeable within a circular groove of the housing, the groove being spaced radially outwardly from and extending circumferentially about the seal; and
    an annular bead extending axially outwardly from the disk first radial surface and disposed radially between the annular projection and the central bore, the bead being disposeable on the seal such that when the disk second radial surface is contacted by the component, at least a portion of the disk is pivoted about the bead such that the projection engages against a sidewall of the groove.

2. The shield device as recited in claim 1 wherein the disk is generally frustoconical such that the first radial surface is generally convex and the second radial surface is generally concave, the component deflecting the disk generally axially toward the housing upper surface when the component is mounted to the shaft.

3. The shield device as recited in claim 1 further comprising an outer skirt extending axially from and circumferentially about at least a portion of the disk outer edge and sized to at least partially enclose an annular opening between the disk outer edge and the housing upper surface.

4. The shield device as recited in claim 3 wherein the skirt is configured to overlap a generally circular projection of the housing that at least partially surrounds the shaft.

5. The shield device as recited in claim 3 further comprising an annular bead extending axially outwardly from the disk first surface and spaced radially outwardly from the central bore, the bead being disposeable on the seal such that when the disk is contacted by the component, the disk is pivoted about the bead such that the skirt engages against the housing cylindrical surface.

6. The shield device as recited in claim 5 wherein the disk is generally frustoconical such that the first radial surface is generally convex and the second radial surface is generally concave, the component deflecting the disk generally axially toward the housing upper surface when the component is mounted to the shaft.

7. The shield device as recited in claim 3 wherein the skirt extends partially about the disk outer edge or extends about the entire disk outer edge.

8. The shield device as recited in claim 1 further comprising a tab extending axially outwardly from the second radial surface and being disposeable within a slotted opening of the driven component so as to connect the disk with the component.

9. A shield device for preventing materials from contacting an annular seal, the seal sealing about a shaft extending outwardly from a housing upper surface, the shaft being angularly displaceable about an axis to displace a driven component mounted on the shaft, the shield device comprising:
    an annular disk having a centerline, a first radial surface, an opposing second radial surface, an outer circumferential edge and an inner circumferential edge defining a central bore sized to receive the shaft, the disk being coupleable with the shaft so as to be disposed between the component and the housing and spaced axially above the seal such that the first radial surface generally faces the seal, the disk having an outside diameter greater than an outside diameter of the seal such that the disk overlaps the seal and the disk outer edge is spaced radially outwardly from the seal so as to provide a barrier about the seal;
    an annular projection extending axially outwardly from the first radial surface, spaced radially outwardly from the disk bore, and extending circumferentially about the disk centerline, the projection being at least partially disposeable within a circular groove of the housing, the groove being spaced radially outwardly from and extending circumferentially about the seal; and
    an annular bead extending axially outwardly from the disk first radial surface and disposed radially between the annular projection and the central bore, the bead being disposeable on the seal such that when the disk second radial surface is contacted by the component, at least a portion of the disk is pivoted about the bead such that the projection engages against a sidewall of the groove;
    wherein the disk is generally frustoconical such that the first radial surface is generally convex and the second radial surface is generally concave, the component deflecting the disk generally axially toward the housing upper surface when the component is mounted to the shaft.

10. The shield device as recited in claim 9 further comprising an outer skirt extending axially from and circumferentially about at least a portion of the disk outer edge and sized to at least partially enclose an annular opening between the disk outer edge and the housing upper surface.

11. The shield device as recited in claim 10 further comprising an annular bead extending axially outwardly from the disk first surface and spaced radially outwardly from the central bore, the bead being disposeable on the seal such that when the disk is contacted by the component, the disk is pivoted about the bead such that the skirt engages against the housing cylindrical surface.

12. A shield device for preventing materials from contacting an annular seal, the seal sealing about a shaft extending outwardly from a housing upper surface, the shaft being angularly displaceable about an axis to displace a driven component mounted on the shaft, the shield device comprising:

an annular disk having a centerline, a first radial surface, an opposing second radial surface, an outer circumferential edge and an inner circumferential edge defining a central bore sized to receive the shaft, the disk being coupleable with the shaft so as to be disposed between the component and the housing and spaced axially above the seal such that the first radial surface generally faces the seal, the disk having an outside diameter greater than an outside diameter of the seal such that the disk overlaps the seal and the disk outer edge is spaced radially outwardly from the seal;

an outer skirt extending axially from and circumferentially about at least a portion of the disk outer edge and sized to at least partially enclose an annular opening between the disk outer edge and the housing upper surface; and an annular head extending axially outwardly from the disk first surface and spaced radially outwardly from the central bore, the bead being disposeable on the seal such that when the disk is contacted by the component, the disk is pivoted about the bead such that the skirt engages against the housing cylindrical surface.

13. The shield device as recited in claim 12 wherein the disk is generally frustoconical such that the first radial surface is generally convex and the second radial surface is generally concave, the component deflecting the disk generally axially toward the housing upper surface when the component is mounted to the shaft.

14. The shield device as recited in claim 12 further comprising an annular projection extending axially outwardly from the first radial surface, spaced radially outwardly from the disk bore, and extending circumferentially about the disk centerline, the projection being at least partially disposeable within a circular groove of the housing, the groove being spaced radially outwardly from and extending circumferentially about the seal.

15. The shield device as recited in claim 12 wherein the skirt extends partially about the disk outer edge or extends about the entire disk outer edge.

* * * * *